United States Patent [19]

Takyu et al.

[11] Patent Number: 5,276,127
[45] Date of Patent: Jan. 4, 1994

[54] POLYESTER RESIN FOR TONER

[75] Inventors: Masayuki Takyu; Noriyuki Tajiri; Hitoshi Iwasaki; Shinji Kubo; Masahiro Itoh; Hirokazu Ito, all of Toyohashi, Japan

[73] Assignee: Mitsubishi Rayon Company Ltd., Tokyo, Japan

[21] Appl. No.: 744,333

[22] Filed: Aug. 13, 1991

[30] Foreign Application Priority Data

Aug. 17, 1990 [JP] Japan .................. 2-215888

[51] Int. Cl.$^5$ ............................................ C08G 63/02
[52] U.S. Cl. .................... 528/194; 430/109; 528/176; 528/193; 528/219; 528/272; 528/296; 528/307; 528/308
[58] Field of Search ................ 430/109; 528/176, 193, 528/194, 219, 272, 296, 307, 308

[56] References Cited

U.S. PATENT DOCUMENTS

| Re. 31,072 | 11/1982 | Jadwin et al. | 430/109 |
| 4,387,211 | 6/1983 | Yasuda et al. | 528/179 |
| 4,804,622 | 2/1989 | Tanaka et al. | 430/109 |
| 4,849,495 | 7/1989 | Funato et al. | 528/194 |
| 4,933,252 | 6/1990 | Nishikawa et al. | 430/109 |
| 4,980,448 | 12/1990 | Tajiri et al. | 528/194 |
| 5,015,724 | 5/1991 | Kawabe | 528/272 |
| 5,049,646 | 9/1991 | Tyagi et al. | 528/272 |

FOREIGN PATENT DOCUMENTS

| 0333498 | 9/1989 | European Pat. Off. . |
| 0409557 | 1/1991 | European Pat. Off. . |
| 57-37353 | 3/1982 | Japan . |
| 2082788 | 3/1982 | United Kingdom . |
| 2100873 | 1/1983 | United Kingdom . |

OTHER PUBLICATIONS

Patent Abstracts of Japan, vol. 11, No. 232(C-437){2679}, Jul. 29, 1987, & JP-A-62-45622, Feb. 27, 1987, S. Kimura, et al., "Polyester Resin for Tower".

Primary Examiner—John Kight, III
Assistant Examiner—T. Mosely
Attorney, Agent, or Firm—Oblon, Spivak, McClelland, Maier & Neustadt

[57] ABSTRACT

A polyester resin for a toner capable of being stably prepared without an occurrence of an abrupt crosslinking reaction is provided. This polyester resin has a crosslinked structure and is derived from (a) at least one member selected from the group consisting of tribasic and tetrabasic carboxylic acid components and trihydric and tetrahydric alcohol components, (b) an aromatic or alicyclic diol component, at least one of the hydroxyl groups of which is a secondary hydroxyl group, (c) optionally other diol component, and (d) a dicarboxylic acid component, wherein the contents of the units of the component (a) and the units of the component (b) satisfy the requirement represented by the following formula (1):

$$(8m+20n)a-(80m+80n) \leqq b \leqq (8m+20-n)a-(12m+30n) \quad (1)$$

wherein m represents the molar fraction of the tribasic carboxylic acid component and trihydric alcohol component units in the units derived from the component (a), n represent the molar fraction of the tetrabasic carboxylic acid component units and tetrahydric alcohol component units in the units derived from the component (a), the sum of m and n is equal to 1, and a and b represent the molar ratios (mole %) of the units of the component (a) and the units of the component (b) based on the total of the carboxylic acid components, respectively.

9 Claims, No Drawings

POLYESTER RESIN FOR TONER

BACKGROUND OF THE INVENTION

(1) Field of the Invention

The present invention relates to a polyester resin for a toner usable for developing an electrostatic charged image and a magnetic latent image in electrophotography, electrostatic recording, electrostatic printing and the like.

(2) Description of the Related Art

For forming an image in electrophotography, electrostatic printing or the like, a method is adopted in which an image to be recorded is converted to an electronic latent image such as an electrostatic charged image or an electroconductive image on the surface of an electrostatic recording material, the latent image is developed and formed with a charged toner, and the formed toner image on the surface of the electrostatic recording material is transferred and fixed on a paper sheet or a recording film. This image-forming method is advantageous in that the copying operation can be performed at a high speed, the fixing stability of the image on the surface of the recording material is good, and the apparatus used can be manipulated very easily. Accordingly, this image-forming method is widely utilized in the fields of copying machines, laser printers and the like.

For example, for a formation of images by electrophotography, the surface of a roller composed of a photoconductive photosensitive material is subjected to a charging treatment, an electrostatic latent image formed by light exposure to rays reflected from the surface of an original is formed with a toner, the obtained toner image is transferred to a paper sheet or the like, and the transferred toner image is fixed to the paper sheet by compression under heating.

As the binder resin for the toner, there are used a styrene/acrylic resin, a polyester resin, an epoxy resin and the like, but recently a polyester resin has attracted attention as a binder resin having an excellent fixing property, giving a good image, and having a good resistance to plasticizers which are conventionally used for polyvinyl chloride and other resins.

As important properties required for the toner, there can be mentioned the fixing property and the non-offset property. A process for providing a toner having an excellent fixing property and non-offset property, by giving a crosslinked structure to a binder resin by using a trifunctional or higher polyfunctional monomer, has been proposed. A typical instance of the polyester resin for a toner having a crosslinked structure is disclosed in the specification of U.S. Pat. No. Re. 31,072.

This polyester resin having the crosslinked structure is inevitably prepared through a crosslinking reaction. The crosslinking reaction is different from the polycondensation reaction for a usual linear polyester resin in that the crosslinking reaction is abruptly advanced and a gel is readily formed. Accordingly, the control of the reaction is a very serious problem. In the specification of U.S. Pat. No. 4,849,495, the present inventors have proposed a process for the preparation of a crosslinked polyester in which the polycondensation reaction is carried out under a high vacuum of 150 Torr or less, the vacuum degree is gradually reduced from the point of a start of the crosslinking reaction, and the advance of the crosslinking reaction is thus controlled. Nevertheless, it has been found that, when this preparation process is conducted on an industrial scale, the gelation control sometimes becomes difficult according to the composition of monomers. Namely, it has been found that, in the industrial preparation of a crosslinked polyester, the ease of the control of the gelation depends greatly on the composition of monomers.

SUMMARY OF THE INVENTION

The present inventors carried out an investigation with a view to solving the above-mentioned problem, and as a result, found that if a trivalent or tetravalent monomer (so-called crosslinking agent) and an aromatic or alicyclic diol component having a low esterification reactivity, at least one of hydroxyl groups of which is a secondary hydroxyl group, are used at a specific fixing ratio, a polyester resin having a crosslinked structure can be stably prepared. The present invention was completed based on this finding.

Therefore, a primary object of the present invention is to provide a polyester resin for a toner, which can be stably prepared without an occurrence of an abrupt crosslinking reaction.

In accordance with the present invention, there is crosslinked structure, which is derived from (a) at least one member selected from the group consisting of tribasic and tetrabasic carboxylic acid components and trihydric and tetrahydric alcohol components, (b) an aromatic or alicyclic diol component, at least one of the hydroxyl groups of which is a secondary hydroxyl group, (c) optionally other diol component, and (d) a dicarboxylic acid component, wherein the contents of the units of the component (a) and the units of the component (b) satisfy the requirement represented by the following formula (1):

$$(8m+20n)a-(80m+80n) \leq b \leq (8m+20-n)a-(12m+30n) \quad (1)$$

wherein m represents the molar fraction of the tribasic carboxylic acid component and trihydric alcohol component units in the units derived from the component (a), n represent the molar fraction of the tetrabasic carboxylic acid component units and tetrahydric alcohol component units in the units derived from the component (a), the sum of m and n is equal to 1, and a and b represent the molar ratios (mole %) of the units of the component (a) and the units of the component (b) based on the total of the carboxylic acid components, respectively.

DESCRIPTION OF THE PREFERRED EMBODIMENTS

The tribasic or tetrabasic carboxylic acid component used in the present invention is not particularly critical. For example, there can be mentioned trimellitic acid, toluene-tricarboxylic acid, cyclohexane-tricarboxylic acid, 2,5,7-naphthalenetricarboxylic acid, 1,2,4-butane-tricarboxylic acid, 1,2,5-hexane-tricarboxylic acid, 1,3-dicarboxyl-2-methyl-2-methylene-carboxylpropane, tetra(methylenecarboxyl)methane, 1,2,7,8-octane-tetracarboxylic acid and pyromellitic acid, and anhydrides and lower alkyl esters thereof. These polybasic carboxylic acid components can be used alone or in the form of mixtures of two or more thereof.

The trihydric or tetrahydric alcohol component used in the present invention is not particularly critical. For example, there can be mentioned glycerol, 1,1,1-trimethylolethane, 1,1,1-trimethylolpropane, 1,1,1-trimethylolbutane, pentaerythritol, 1,1,2,2-tetramethylolethane and 1,1,3,3-tetramethylolpropane. These polyhydric alcohol components can be used alone or in the form of mixtures of two or more thereof.

The dicarboxylic acid component used in the present invention is not particularly critical. For example, there can be mentioned terephthalic acid, isophthalic acid, phthalic acid, maleic acid, fumaric acid, mesaconic acid, citraconic acid, itaconic acid, cyclohexanedicarboxylic acid, succinic acid, adipic acid, sebacic acid, malonic acid and glutaric acid, and anhydrides and lower alkyl esters thereof. These dicarboxylic acid components can be used alone or in the form of mixtures of two or more thereof.

The aromatic or alicyclic diol component, at least one of hydroxyl groups of which is a secondary hydroxyl group, used in the present invention is not particularly critical. For example, there can be mentioned polyoxypropylene(k)-2,2-bis(4-hydroxyphenyl)propane (k represents the number of moles of propyleneoxy units), cyclohexanediol, hydrogenated bisphenol A, hydrogenated bisphenol F and hydrogenated bisphenol S. These diol components can be used alone or in the form of a mixture of two or more thereof.

The other diol component used in the present invention is not particularly critical. For example, there can be mentioned ethylene glycol, 1,2-propanediol, 1,3-propanediol, 1,4-butanediol, 1,3-butanediol, 1,2-butanediol, diethylene glycol, triethylene glycol, tetraethylene glycol, 1,6-hexanediol, neopentyl glycol, cyclohexanedimethanol and polyoxyethylene(l)-2,2-bis(4-hydroxyphenyl)propane (l represents the number of moles of ethyleneoxy units). These diol components can be used alone or in the form of mixtures of two or more thereof.

The most important feature of the present invention is that the contents of units of (a) the trivalent or tetravalent polycarboxylic acid component and/or the trihydric or tetrahydric polyhydric alcohol component and units of (b) the aromatic or alicyclic diol component, at least one of hydroxyl groups of which is a secondary hydroxyl group, should satisfy the requirement represented by the above-mentioned formula (1).

If the quantity of units of the component (b) is smaller than the range defined by the formula (1), the crosslinking reaction speed is too high and it becomes difficult to stop the crosslinking reaction. If the quantity of units of the component (b) exceeds the range defined by the formula (1), the reactivity is too low and the reaction does not arrive at the crosslinking point. The quantities of the other diol component (c)(optional component) and the dicarboxylic acid component (d) are appropriately selected according to the quantities of the components (a) and (b) defined by the above-mentioned formula (1).

Preferably, the glass transition temperature (Tg) of the polyester resin of the present invention is 50° to 75° C. If the Tg is lower than 50° C., the blocking resistance of the toner is easily lowered, and if the Tg exceeds 75° C., the fixing property of the toner often becomes poor.

Preferably, the acid value of the resin of the present invention is not larger than 15 mg-KOH/g. If the acid value exceeds 15 mg-KOH/g, the moisture resistance of the toner often becomes poor.

The polyester resin of the present invention can be prepared according to procedures customarily adopted for the production of usual polyester resins. For example, the esterification or ester-exchange reaction is first carried out and continued until the distillation of water or a lower alcohol stops. For this reaction, a known ester-exchange catalyst can be used according to need. Then the polycondensation reaction is carried out under a vacuum of 150 Torr or less, and the reaction is concluded when the reaction mixture arrives at the desired degree of crosslinking. For this reaction, a known polycondensation catalyst can be used according to need.

In the instant specification, by "the crosslinking point" is meant the point at which the viscosity of the reaction mixture abruptly increases during the polycondensation reaction, and "the resin having a crosslinked structure" means a resin which has arrived at the crosslinking point.

The present invention will now be described in detail with reference to the following examples, that by no means limit the scope of the invention.

In the examples, the acid value of the polyester resin was determined by dissolving the sample in benzyl alcohol and titrating the solution with KOH, and the glass transition temperature Tg was determined as the crossing point of the base line of the chart obtained when the measurement was carried out at a temperature-elevating rate of 5° C./min, by using a differential scanning calorimeter and the tangential line of the heat absorption curve in the vicinity of Tg.

EXAMPLE 1

An autoclave having a distillation column and a capacity of 2 litters was charged with terephthalic acid, isophthalic acid, trimellitic anhydride, ethylene glycol, polyoxypropylene-(2,3)-2,2-bis(4-hydroxyphenyl)propane and neopentyl glycol according to the recipe shown in Table 1 (the total amount was 1 kg), and antimony trioxide was added in an amount of 500 ppm (by weight) based on the acid components and the esterification reaction was carried out. At the point at which the distillation of water formed by the reaction stopped, the esterification reaction was concluded. At this point, the stirring torque was 0.3 kg-cm at 100 rpm. Then the polycondensation was carried out at an inner temperature of 240° C. under a vacuum of 3 Torr, the viscosity of the reaction mixture began to increase, and when the torque reached 3.0 kg-cm, the vacuum state was released by nitrogen gas to return the pressure to atmospheric pressure. Stirring was continued while maintaining the inner temperature at 240° C., and although stirring was continued for 30 minutes, the torque was kept almost 3.0 kg-cm. Namely, in the resin of the present example, the crosslinking reaction was not violently advanced but could be stopped at a desired degree of crosslinking. The composition, Tg and acid value of the obtained resin are shown in Table 1.

TABLE 1

| | Charged Amount | Amount in Resin |
|---|---|---|
| Acid Components | | |
| trimellitic anhydride (molar parts) | 11 | 11 |
| terephthalic acid (molar parts) | 89 | 89 |
| isophthalic acid (molar parts) | 10 | 10 |
| Alcohol Components | | |
| BPPO*[1] (molar parts) | 55 | 55 |
| ethylene glycol (molar parts) | 50 | 42 |
| neopentyl glycol (molar parts) | 25 | 20 |
| m | | 1 |
| n | | 0 |
| a | | 10 |
| b | | 50 |

TABLE 1-continued

|  | Charged Amount | Amount in Resin |
|---|---|---|
| Physical Properties of Resin | | |
| Tg (°C.) | | 63 |
| acid value (mg-KOH/g) | | 5 |

Note *¹polyoxypropylene-(2,3)-2,2-bis(4-hydroxyphenyl)propane (same will apply hereinafter in Tables 2, 4, 6 and 8)

EXAMPLES 2 THROUGH 5

According to the charged recipe shown in Table 2, the reaction was carried out in the same manner as described in Example 1. The obtained results are shown in Tables 2 and 3. In each of Examples 2 through 5, the crosslinking reaction could be stopped.

TABLE 3-continued

| Example 3 | after returning of the pressure to atmospheric pressure, torque was kept almost 3.0 kg-cm for 30 minutes |
| Example 4 | same as in Example 3 |
| Example 5 | after returning the pressure to atmospheric pressure, torque increased to 3.8 kg-cm over a period of 10 minutes, but torque was then kept at this value |

EXAMPLES 6 THROUGH 8

The reaction was carried out according to the recipe shown in Table 4 in the same manner as described in Example 1 except that zinc acetate in an amount of 200 ppm (based on weight of the acid components) and dibutyl tin oxide in an amount of 400 ppm (based on the

TABLE 2

| Example No. | 2 Charged Amount | 2 Amount in Resin | 3 Charged Amount | 3 Amount in Resin | 4 Charged Amount | 4 Amount in Resin | 5 Charged Amount | 5 Amount in Resin |
|---|---|---|---|---|---|---|---|---|
| Acid Components | | | | | | | | |
| trimellitic anhydride (molar parts) | 10 | 10 | 14 | 14 | — | — | — | — |
| pyromellitic anhydride (molar parts) | — | — | — | — | 3 | 3 | 5 | 5 |
| terephthalic acid (molar parts) | 90 | 90 | 70 | 70 | 60 | 60 | 90 | 90 |
| isophthalic acid (molar parts) | — | — | 10 | 10 | 37 | 37 | 5 | 5 |
| adipic acid (molar parts) | — | — | 6 | 6 | — | — | — | — |
| Alcohol Components | | | | | | | | |
| BPPO | 15 | 15 | 45 | 45 | 10 | 10 | 25 | 25 |
| hydrogenated bisphenol A (molar parts) | 15 | 15 | 5 | 5 | — | — | — | — |
| ethylene glycol (molar parts) | 90 | 70 | 60 | 54 | 125 | 116 | 65 | 59 |
| diethylene glycol (molar parts) | — | — | — | — | 5 | 4 | — | — |
| BPEO*¹ | 20 | 20 | 10 | 10 | — | — | 25 | 25 |
| m | 1 | | 1 | | 0 | | 0 | |
| n | 0 | | 0 | | 1 | | 1 | |
| a | 10 | | 14 | | 3 | | 5 | |
| b | 30 | | 50 | | 10 | | 25 | |
| Physical Properties of Resin | | | | | | | | |
| Tg (°C.) | 58 | | 65 | | 51 | | 61 | |
| acid value (mg-KOH/g) | 3 | | 14 | | 5 | | 12 | |

Note *¹polyoxyethylene(2,3)-2,2-bis(4-hydroxyphenyl)propane (same will apply hereinafter in Table 10)

TABLE 3

| Example 2 | torque increased to 3.5 kg-cm over a period of 5 minutes after returning of the pressure to atmospheric pressure, but torque was then kept at this level for 30 minutes. | weight of the acid components) were used as the catalyst. The results are shown in Tables 4 and 5. In each of Examples 6 through 8, the crosslinking reaction could be stopped.

TABLE 4

| Example No. | 6 Charged Amount | 6 Amount in Resin | 7 Charged Amount | 7 Amount in Resin | 9 Charged Amount | 9 Amount in Resin |
|---|---|---|---|---|---|---|
| Acid Components | | | | | | |
| terephthalic acid (molar parts) | 50 | 50 | 100 | 100 | 90 | 90 |
| isophthalic acid (molar parts) | 50 | 50 | — | — | 5 | 5 |
| cyclohexane-dicarboxylic acid (molar parts) | — | — | — | — | 5 | 5 |
| Alcohol Components | | | | | | |
| pentaerythitol (molar parts) | 4 | 4 | 6 | 6 | — | — |
| trimethylol propane (molar parts) | — | — | — | — | 15 | 15 |
| BPPO | 40 | 40 | 65 | 65 | 60 | 60 |
| hydrogenated bisphenol A (molar parts) | — | — | 10 | 10 | 10 | 9 |
| cyclohexanediol (molar parts) | 10 | 7 | — | — | — | — |
| ethylene glycol (molar parts) | 71 | 54 | 30 | 18 | 45 | 40 |
| triethylene glycol (molar parts) | — | — | 10 | 10 | — | — |
| m | 0 | | 0 | | 1 | |
| n | 1 | | 1 | | 0 | |
| a | 4 | | 6 | | 15 | |
| b | 47 | | 75 | | 69 | |
| Physical Properties of Resin | | | | | | |
| Tg (°C.) | 64 | | 67 | | 71 | |
| acid value (mg-KOH/g) | 2 | | 5 | | 6 | |

TABLE 5

| | |
|---|---|
| Example 6 | after returning of the pressure to atmospheric pressure, torque was kept about 3.0 kg-cm for 30 minutes |
| Example 7 | after returning of the pressure to atmospheric pressure, torque increased to 3.5 kg-cm over a period of 10 minutes but torque was then kept constant |
| Example 8 | after returning of the pressure to atmospheric pressure, torque was kept almost 3.0 kg-cm for 30 minutes |

COMPARATIVE EXAMPLES 1 THROUGH 3

The reaction was carried out in the same manner as described in Example 1 except that the starting materials were charged in amounts shown in Table 6. In Comparative Example 1, the reaction did not arrive at the crosslinking point. In Comparative Examples 2 and 3, the crosslinking reaction could not be stopped.

TABLE 6

| | 1 | | 2 | | 3 | |
|---|---|---|---|---|---|---|
| Comparative Example No. | Charged Amount | Amount in Resin | Charged Amount | Amount in Resin | Charged Amount | Amount in Resin |
| Acid Components | | | | | | |
| trimellitic anhydride (molar parts) | 6 | 6 | 19 | 19 | — | — |
| pyromellitic acid (molar parts) | — | — | — | — | 8 | 8 |
| terephthalic acid (molar parts) | 85 | 85 | 51 | 51 | 70 | 70 |
| isophthalic acid (molar parts) | 9 | 9 | 30 | 30 | — | — |
| adipic acid (molar parts) | — | — | — | — | 22 | 22 |
| Alcohol Components | | | | | | |
| BPPO (molar parts) | 45 | 45 | 65 | 65 | 25 | 25 |
| hydrogenated bisphenol A (molar parts) | 5 | 4 | 5 | 5 | — | — |
| ethylene glycol (molar parts) | 70 | 56 | 40 | 35 | 100 | 90 |
| 1,4-butanediol (molar parts) | 10 | 8 | — | — | 10 | 7 |
| m | | 1 | | 1 | | 0 |
| n | | 0 | | 0 | | 1 |
| a | | 6 | | 19 | | 8 |
| b | | 50 | | 70 | | 25 |
| Physical Properties of Resin | | | | | | |
| Tg (°C.) | | — | | 61 | | 53 |
| acid value (mg-KOH/g) | | — | | 24 | | 14 |

COMPARATIVE EXAMPLES 4 THROUGH 6

The reaction was carried out in the same manner as described in Example 4 except that the starting materials were charged in amounts shown in Table 8. The results are shown in Tables 8 and 9. In Comparative Examples 4 and 5, the reaction did not arrive at the crosslinking point. In Comparative Example 6, the crosslinking reaction could not be stopped.

TABLE 8

| | 4 | | 5 | | 6 | |
|---|---|---|---|---|---|---|
| Comparative Example No. | Charged Amount | Amount in Resin | Charged Amount | Amount in Resin | Charged Amount | Amount in Resin |
| Acid Components | | | | | | |
| terephthalic acid (molar parts) | 60 | 60 | 50 | 50 | 60 | 60 |
| isophthalic acid (molar parts) | 40 | 40 | 50 | 50 | 40 | 40 |
| Alcohol Components | | | | | | |
| pentaerythritol (molar parts) | 2 | 2 | 5 | 5 | — | — |
| trimethylolpropane (molar parts) | — | — | — | — | 13 | 13 |
| BPPO (molar parts) | 25 | 25 | 90 | 90 | 15 | 15 |
| hydrogenated bisphenol A (molar parts) | 5 | 5 | — | — | — | — |
| ethylene glycol (molar parts) | 70 | 53 | 25 | 13 | 77 | 69 |
| triethylene glycol (molar parts) | 18 | 18 | — | — | — | — |
| neopentyl glycol (molar parts) | — | — | — | — | 10 | 8 |
| m | | 0 | | 0 | | 1 |
| n | | 1 | | 1 | | 0 |
| a | | 2 | | 5 | | 13 |
| b | | 30 | | 90 | | 15 |
| Physical Properties of Resin | | | | | | |
| Tg (°C.) | | — | | — | | 57 |
| acid value (mg-KOH/g) | | — | | — | | 6 |

TABLE 7

| | |
|---|---|
| Comparative Example 1 | polycondensation was conducted for 10 hours, but viscosity of reaction mixture did not increase |
| Comparative Example 2 | after returning of the pressure to atmospheric pressure, torque increased to 7.0 kg-cm over a period of 10 minutes and viscosity rose, and hence, stirring was stopped and resin was taken out from reaction vessel |
| Comparative Example 3 | after torque increased 1.0 kg-cm, viscosity rose abruptly and reaction was not stopped even by returning the pressure to atmospheric pressure and stopping stirring, and viscosity of resin became too high and recovery of resin from reaction vessel was very difficult |

TABLE 9

| | |
|---|---|
| Comparative Examples 4 and 5 | although polycondensation was conducted for 10 hours, viscosity of reaction mixture did not rise |
| Comparative Example 6 | after torque exceeded 1.0 kg-cm, viscosity rose abruptly and reaction could not be |

TABLE 9-continued stopped even by returning the pressure to atmospheric pressure and stopping stirring, and viscosity of resin became too high and recovery of product from reaction vessel was very difficult

EXAMPLES 9 AND 10

The reaction was carried out according to the charged recipe shown in Table 10, in the same manner as described in Example 1. The results are shown in Tables 10 and 11. In each of Examples 9 and 10, the crosslinking reaction could be stopped.

TABLE 10

| Example No. | 9 Charged Amount | 9 Amount in Resin | 10 Charged Amount | 10 Amount in Resin |
|---|---|---|---|---|
| Acid Components | | | | |
| trimellitic ahydride (molar parts) | 18 | 18 | 7 | 7 |
| terephthalic acid (molar parts) | 72 | 72 | 53 | 53 |
| isophthalic acid (molar parts) | 10 | 10 | 40 | 40 |
| Alcohol Components | | | | |
| BPPO (molar parts) | 60 | 60 | 40 | 40 |
| hydrogenated bisphenol A (molar parts) | 5 | 5 | — | — |
| ethylene glycol (molar parts) | 65 | 60 | 80 | 74 |
| BPEO (molar parts) | 10 | 10 | — | — |
| m | | 1 | | 1 |
| n | | 0 | | 0 |
| a | | 18 | | 7 |
| b | | 65 | | 40 |
| Physical Properties of Resin | | | | |
| Tg (°C.) | | 61 | | 66 |
| acid value (mg-KOH/g) | | 4.8 | | 5.2 |

TABLE 11

| | |
|---|---|
| Example 9 | after returning the presence to atmospheric pressure, torque increased to 3.7 kg-cm over a period of 10 minutes, but torque was then kept almost constant for 30 minutes |
| Example 10 | after returning the pressure to atmospheric pressure, torque was kept at about 3.0 kg-cm for 30 minutes |

As apparent from the foregoing detailed description, the polyester resin for a toner according to the present invention is a resin having a crosslinked structure, which has a combination of a good fixing property and a good non-offset property, and this polyester resin can be stably prepared without the occurrence of an abrupt crosslinking reaction.

We claim:

1. A polyester resin for a toner having a crosslinked structure, which is derived from (a) at least one member selected from the group consisting of tribasic and tetrabasic carboxylic acid components and trihydric and tetrahydric alcohol components, (b) an aromatic or alicyclic diol component, at least one of the hydroxyl groups of which is a secondary hydroxyl group and either (c) another diol component and (d) a dicarboxylic acid component or (d) a dicarboxylic acid component, wherein the contents of the units of component (a) and the units of component (b) satisfy the requirements represented by the following formula (1):

$$(8m+20n)a-(80m+80n) \leq b \leq (8m+20n)a-(12m+30n) \tag{1}$$

wherein m represents the molar fraction of the tribasic carboxylic acid component and trihydric alcohol component units in the units derived from the component (a), n represents the molar fraction of the tetrabasic carboxylic acid component units and tetrahydric alcohol component units in the units derived from the component (a), the sum of m and n is equal to 1, and a and b represent the molar ratios (mole %) of the units of the component (a) and the units of the component (b) based on the total of the carboxylic acid components, respectively, provided that when $m=1$ and $n=0$, $a \geq 16$ and when $m=0$ and $n=1$, $a \geq 6$.

2. A polyester resin as set forth in claim 1, wherein the tribasic or tetrabasic carboxylic acid component is selected from the group consisting of trimellitic acid, toluene-tricarboxylic acid, cyclohexane-tricarboxylic acid, 2,5,7-naphthalene-tricarboxylic acid, 1,2,4-butane-tricarboxylic acid, 1,2,5-hexane-tricarboxylic acid, 1,3-dicarboxyl-2-methyl-2-methylene-carboxylpropane, tetra(methylene-carboxyl)methane, 1,2,7,8-octane-tetracarboxylic acid, pyromellitic acid and anhydrides and lower alkyl esters thereof.

3. A polyester resin as set forth in claim 1, wherein the trihydric or tetrahydric alcohol component is selected from the group consisting of glycerol, 1,1,1-trimethylolethane, 1,1,1-trimethylolpropane, 1,1,1-trimethylolbutane, pentaerythritol, 1,1,2,2-tetramethylolethane and 1,1,3,3-tetramethylolpropane.

4. A polyester resin as set forth in claim 1, wherein the dicarboxylic acid component is selected from the group consisting of terephthalic acid, isophthalic acid, phthalic acid, maleic acid, fumaric acid, mesaconic acid, citraconic acid, itaconic acid, cyclohexane-dicarboxylic acid, succinic acid, adipic acid, sebacic acid, malonic acid and glutaric acid, and anhydrides and lower alkyl esters thereof.

5. A polyester resin as set forth in claim 1, wherein the aromatic or alicyclic diol component is selected from the group consisting of polyoxypropylene-(m)-2,2-bis(4-hydroxyphenyl)propane (m represents the number of moles of propyleneoxy units), cyclohexanediol, hydrogenated bisphenol A, hydrogenated bisphenol F and hydrogenated bisphenol S.

6. A polyester resin as set forth in claim 1, wherein diol component (c) is selected from ethylene glycol, 1,2-propane diol, 1,3-propanediol, 1,4-butanediol, 1,3-butanediol, 1,2-butanediol, diethylene glycol, triethylene glycol, tetraethylene glycol, 1,6-hexanediol, neopentyl glycol, cyclohexanedimethanol and polyoxyethylene(n)-2,2-bis(4-hydroxyphenyl)propane (n represents the number of moles of ethyleneoxy units).

7. A polyester resin as set forth in claim 1, which has a glass transition temperature of 50° to 75° C.

8. A polyester resin as set forth in claim 1, which has an acid number of not larger than 15 mg-KOH/g.

9. A polyester resin as set forth in claim 1, wherein the glass transition temperature of the polyester resin is 50° to 75° C. and the acid value of the resin is not larger than 15 mg-KOH/g.

* * * * *